METHOD FOR ACTIVATING PLASTICS, SUBSEQUENT METALLIZATION AND ARTICLE OF MANUFACTURE RESULTING THEREFROM

Filed Jan. 13, 1967

INVENTORS
ZLATA KOVAC
JUDITH D. OLSEN

BY Thomas J. Kilgannon Jr.
ATTORNEY 3,488,166

METHOD FOR ACTIVATING PLASTICS, SUBSEQUENT METALLIZATION AND ARTICLE OF MANUFACTURE RESULTING THEREFROM

Zlata Kovac, Bronx, and Judith D. Olsen, White Plains, N.Y., assignors to International Business Machines Corporation, Armonk, N.Y., a corporation of New York Filed Jan. 13, 1967, Ser. No. 609,195
Int. Cl. C23c *3/00;* C23b *5/08*
U.S. Cl. 29—195 21 Claims

ABSTRACT OF THE DISCLOSURE

A method for activating plastics such as urea formaldehyde for subsequent metallization in which the plastic to be metallized is dipped in a solution of one of the constituents of the plastic, which is a reducing agent in solution for a catalytic salt, formaldehyde in this instance, and dried in air to polymerize the formaldehyde and form a chemical bond with the plastic. A subsequent dipping in a heated solution of palladium chloride causes the formaldehyde to de-polymerize and wherever the polymer chain opens, at these sites, one palladium ion is directly reduced to palladium metal. Electroless deposition of a metal such as nickel is then carried out by immersing the plastic in an electroless plating bath to provide the low resistance path necessary for a subsequent electroplating step. The resulting article of manufacture consists of a plastic substrate of urea formaldehyde; a film of formaldehyde chemically bonded to the surface of the urea formaldehyde; a plurality of palladium particles interspersed in and chemically bonded with said formaldehyde and; a layer of nickel overlying said formaldehyde layer and intimately bonded thereto by the palladium particles.

BACKGROUND OF THE INVENTION

Field of the invention

This invention relates generally to methods for plating plastics with metals. More specifically it relates to a method for activating plastics for subsequent metallization. The metallized plastics resulting from the method of this invention have extremely adherent metal coatings which are not subject to flaking or chipping and have application in the printing art in the manufacture of typing heads and the like.

Description of the prior art

Metallization of plastics has been known for many years and the prior art is replete with techniques for accomplishing it. Most of the known techniques utilize the reduction of metal from a catalytic salt to form sites for a subsequent electroless plating of a self-catalytic metal. Once a catalytic metal has been reduced from its catalytic salt, there appears to be no great problem in forming a metal coating by electroless plating to form a conductive surface for a subsequent electroplating step. However, once the final metal is electroplated, and the metallized plastic is put to use, difficulties arise because of low adhesion characteristics between the metal and the plastic on which it is coated. Chipping, flaking and peeling of the metal are a result of this condition, particularly in applications where the metallized plastic is subject to deformations and impact loading. The prior art has recognized that the adhesion problem arises because of insufficient chemical bonding of the metal to the plastic and many techniques have been suggested to overcome this difficulty. For example, one technique teaches that a thin, continuous, uniform layer of silver or nickel can be tenaciously bound to the surface of a solid material having ion exchange groups chemically bonded to an organic compound which is chemically and/or physically bonded to such surface by contacting the surface with a solution containing palladium ions, for instance, thereby displacing a hydrogen atom of the ion exchange groups and forming the corresponding metal salt by the chemical union of said ions and said ion exchange group. Thus, the formed metal salt is contacted with a reducing agent converting the metallic component of the salt to elemental metal thereby providing tightly held catalyst sites. The process is accomplished by coating the nonmetallic surface with ion-exchange dyes which capture a metal from a solution, are reduced by a reducing agent to form an elemental metal at sites in the ion exchange material, and then coated with the desired metal. Other techniques are relatively straightforward, and utilize scouring of the surface by sandblasting to provide a greater surface area into which palladium or other catalytic metal can be deposited by chemical reduction using mixtures of complexing agents and reducing agents to produce the elemental metal in the plastic. The above mentioned techniques are either too complex for production line operations, require large expenditures for ancillary equipment or actually do not provide strongly adherent coatings which will stand up under repeated deformations and impact loading.

SUMMARY OF THE INVENTION

The method of the present invention, in its broadest aspect, comprises the step of polymerizing a coating of a constituent of a plastic to be coated on the surface of the plastic. The constituent of the plastic which is polymerized is a reducing agent for a catalytic salt. After coating the plastic, the coated plastic is depolymerized in the presence of a reducible catalytic salt to chemically bond the metal of the catalytic salt to the coating. An electroless plating step is then undertaken to plate an adherent, conductive, metal coating on the surface of the first mentioned coating by plating in a solution of a metal which is catalyzed by the metal of the catalytic salt. After the conductive coating is formed, an electroplating step is accomplished using well known prior art techniques.

In accordance with a more particular aspect of the invention, a urea formaldehyde plastic is coated with formaldehyde and dried to polymerize the coating. The coated plastic is then dipped into a heated solution of a reducible catalytic salt, palladium chloride, for example, where the formaldehyde coating undergoes depolymerization. In this step, the formaldehyde chains, some of which are chemically bonded to the plastic, open randomly along their length and provide sites for a chemical bond with the metal of the reducible catalytic salt. The formaldehyde which is present as a coating reduces the catalytic salt, palladium chloride, and particles of the reduced palladium chemically bond with the formaldehyde at the above mentioned sites. The palladium metal, in this manner, is interspersed in the formaldehyde coating. The now activated plastic is placed in an electroless plating bath where the palladium particles catalyze the plating metal, nickel, for example, from the solution. Plating continues until a thin adherent coating of nickel suitable for a subsequent electroplating step is deposited on the plastic. A metallic coating, chemically bonded to the surface of the plastic results, which is not subject to flaking, chipping or peeling and is capable of withstanding more deformation and impact loading than prior art metallized plastics.

It is, therefore, an object of this invention to provide a metallized plastic which is durable, impact resistant and simple to manufacture.

Another object is to provide a manufacturing technique which permits the formation of a highly adherent metal coating on the surface of a plastic.

Still another object is to provide a method for activating plastics which permits the formation of relatively large quantities of a catalytic metal in sites which become available in a de-polymerized coating on the surface of the plastic.

The foregoing and other objects, features and advantages of the invention will be apparent from the following more particular description of a preferred embodiment of the invention as illustrated in the accompanying drawings.

DESCRIPTION OF THE PREFERRED EMBODIMENT

Figure 1:
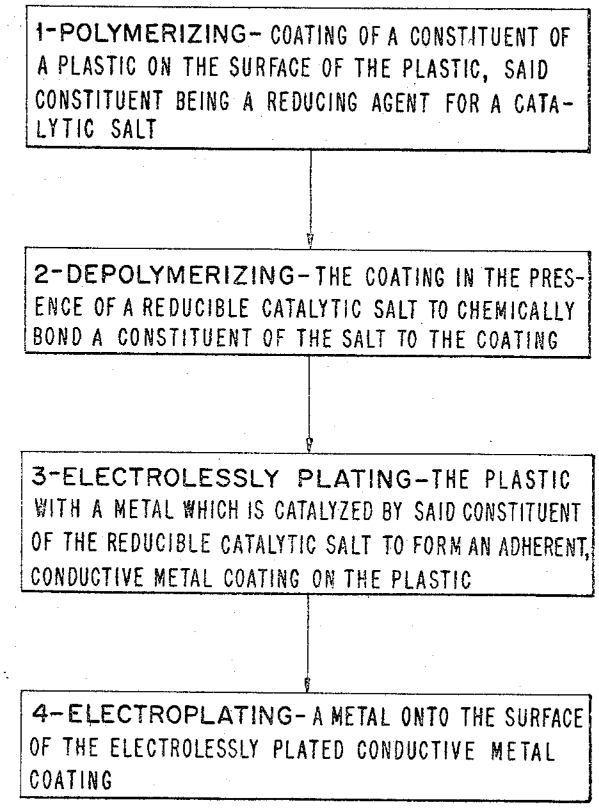
FIG. 1 is a flow chart diagrammatically outlining the principal method steps for activating and metallizating a plastic.

In accordance with preferred method steps as outlined in flow chart form in FIG. 1, a metallized plastic is manufactured as follows:

Step 1.—Polymerizing a coating of a constituent of a plastic on the surface of said plastic, the coated constituent being a reducing agent for a catalytic salt.

This step can be best understood by considering the following group of plastics: urea formaldehyde, phenolic formaldehyde plastics, melamine formaldehyde plastics and aryl sulfonamide-formaldehyde resins. The plastics of this group are related, for purposes of the present invention, by the fact that they all contain a formaldehyde group as part of their chemical make-up. Formaldehyde, in solution, is a well-known reducing agent for catalytic salts such as palladium chloride. It has been recognized that free bonds exist at the surface of all the members of the groups of plastics tested above. The prior art, recognizing the availability of free bonds, has introduced a catalytic metal directly by the reduction of a catalytic salt, palladium chloride, which causes elemental metal to chemically bond with some of the available free bonds. The prior art has attempted to increase the number of available free bonds by roughening the surface using a sandblasting step, for example. It is at this point that the present invention departs from the prior art by a polymerization step which chemically bonds a coating of formaldehyde with the free bonds existing on the surface of the plastic, urea formaldehyde, for example. The remainder of the formaldehyde molecules which do not directly bond with the surface of the urea formaldehyde plastic are polymerized and form a coating on the surface of the plastic.

Using urea formaldehyde and formaldehyde as an example of the plastic and coating, respectively, the polymerizing step includes the following preferred steps:

(1a) Soak a urea formaldehyde substrate in a 1:1 solution of nitric acid and water and then rinse in distilled water.

This step, while not necessary in the practice of the present invention, enhances the overall characteristics of the resulting metallized plastic. In addition to cleaning the plastic, the nitric acid soak chemically breaks down a skin layer of the plastic and makes available more free bonds.

(1b) Dip the urea formaldehyde plastic into a solution of formaldehyde. Formaldehyde, as indicated above, is a reducing agent for catalytic salts as well as being a constituent of the plastic. The formaldehyde, therefore, has an affinity for the plastic and chemically bonds with the available free bonds in the urea formaldehyde. A solution of 37.5% formaldehyde may be used. The content of formaldehyde in solution is not critical. The only effect of using solutions having low percentages of formaldehyde therein is that the time for electrolessly plating is lengthened. The plastic is dipped in formaldehyde for approximately ten minutes. The time has been found to be convenient and is not critical.

(1c) Dry the coated plastic in air to polymerize the molecules of formaldeyde which remain unbonded to the surface of the urea formaldehyde plastic.

The step of drying is essential in the practice of this invention. Experimental results have shown that particles of the catalytic metal will not bond with the formaldehyde coating unless it is polymerized by drying. Where the coating is not dried, palladium is reduced but it shows up as a black precipitate in the palladium chloride solution. If palladium does not chemically bond to the formaldehyde, good adhesion by plating cannot take place. The drying time is not critical and may be shortened by heating the coated plastic.

Step. 2.—Depolymerizing the formaldehyde coating in the presence of a reducible catalytic salt to chemically bond a constituent of the salt to the coating.

Depolymerizing the coating, as indicated above, means that the molecules of formaldehyde are opened at various sites along the length of the existing molecular chains. This step is carried out in the presence of a reducible catalytic salt so that, upon being reduced by the formaldehyde, elemental palladium is deposited and chemically bonded to the formaldehyde at the above mentioned sites. Reducible catalytic salts such as palladium chloride, gold chloride, nickel chloride, nickel sulphate, cobalt sulphate and copper sulphate are suitable salts. The constituent of the reducible catalytic salt bonded to the coating is in all cases the metallic element of the salt.

Using urea formaldehyde as the plastic; formaldehyde as the coating and palladium chloride as the reducible catalytic salt, the depolymerizing steps include the following preferred steps.

(2a) Dip the coated plastic into the original formaldehyde solution momentarily (e.g. 10 seconds) to initiate depolymerization.

This step, after drying, is not essential but is preferred in that the resulting plated plastic has better characteristics. The dipping in formaldehyde solution appears to initiate the opening of the formaldehyde chains to provide sites for the deposition of palladium. This step can be carried out at room temperature for urea formaldehyde plastics, but where reinforced phenolic plastics are used an alkaline formaldehyde solution is preferred and should be heated to a temperature of 50° C.

(2b) Heat a solution of palladium chloride to a temperature in the range of 50°–65° C.

A palladium chloride solution consisting of 1 gram/liter of palladium chloride and 10 cc./liter of concentrated HCl is heated to a temperature which will depolymerize the formaldehyde.

(2c) Dip the coated urea formaldehyde plastic into the heated palladium chloride solution for approximately 1 minute to depolymerize or open the formaldehyde molecular chains to make sites available for bonding with the subsequently reduced palladium metal. The dipping time has been found to be convenient and may vary widely.

(2d) Reduce the catalytic salt to intersperse the formaldehyde at the available sites with palladium.

While immersed in the palladium chloride solution, the heat of the solution causes opening of the formaldehyde chains and apparently causes some of the formaldehyde to dissolve. This causes the reduction of the catalytic metal in the palladium chloride to elemental palladium. The palladium then becomes chemically bonded to the formaldehyde layer at the sites made available by opening of its molecular chains. The coating at this point has been activated and can be immediately plated in an electroless bath with self-catalytic metals or alloys thereof. In the preferred method, however, the following additional steps are taken.

(2e) Dip the plastic alternately into the formaldehyde solution and the palladium chloride solution at least two times to increase the available sites and enhance the bonding of palladium with the formaldehyde.

The plastic may be immersed in each solution for a period of 10 seconds. This step is not essential in obtaining an improved metallized plastic but, the characteristics of the resulting coating are even further improved by the above recited step.

Step 3.—Electrolessly plate the activated, coated urea formaldehyde plastic in a plating bath. The metal plated in this manner is catalyzed by the palladium disposed in the formaldehyde coating and may be a self-catalytic metal or alloy thereof. Suitable metals, include nickel, cobalt, copper and palladium and suitable alloys include nickel iron, nickel cobalt and nickel tungsten phosphorous. Such metals and alloys are characterized as self-catalytic because once any of these metals or alloys is catalyzed by the elemental metal interspersed in the formaldehyde coating, the catalysis does not cease but rather continues because each particle of the plated metal is capable of catalyzing itself. In this manner, a thin conductive coating plates on the surface of the formaldehyde layer.

The electroless plating of nickel onto the formaldehyde coating may be carried out in both basic and acidic plating baths using the following nickel plating solution for example.

ELECTROLESS NICKEL PLATING BATH

Basic 0.1 molar $NiSO_4$
1.0 molar $NH_4Cl$
0.2 molar $NaH_2PO_2$
NaOH pH 9 at room temperature
Plating time 3 minutes Acidic

| | Gm./l. |
|---|---|
| $NiSO_46H_2O$ | 18.4 |
| $NaH_2PO_2 \cdot H_2O$ | 24.4 |
| Glacial $HC_2H_3O_2$ | 3.8 |
| $NaC_2H_3O_2$ | 4.7 |
| Lactic acid 85% sln. | 34.0 |
| $Pb(C_2H_3O_2)$ | .007 |
| Succinic acid | 5.7 |

pH 5.2 with concentrated NaOH at plating temperature (60–70° C.).

Other relatively standard solutions for plating other catalytic metals and alloys thereof are well known to those skilled in the plating arts.

Step 4.—Electroplate a metal onto the surface of the electrolessly plated metal for a time sufficient to obtain a desired thickness of metal. The electroplating step can be carried out using any conventional electroplating arrangement well known to those skilled in the electroplating art. A typical electroplating bath is Watts nickel bath.

Figure 2:
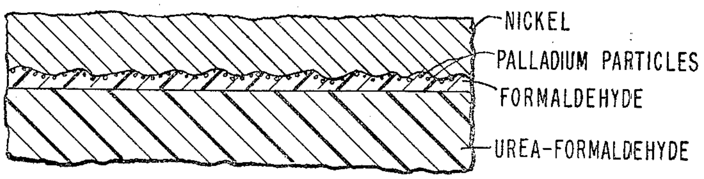
FIG. 2 is a cross-sectional view of an activated and metallized plastic showing the arrangement of the various layers obtained using the method outlined in FIG. 1.

The above-described steps provide a plated substrate which, as shown in cross-section in FIG. 2, consists of a substrate of urea formaldehyde plastic having a coating of formaldehyde disposed on and bonded to its surface. Interspersed in the coating are palladium particles which are chemically bonded to the formaldehyde. The palladium particles are also chemically bonded to a layer of nickel which is disposed in overlying relationship with the formaldehyde layer.

The method of this invention has been described using urea formaldehyde plastics. As indicated hereinabove other plastics such as phenolic formaldehyde and melamine formaldehyde plastics and arylsulfonamide-formaldehyde resins may be used. Since there are literally hundreds of suitable plastics within these groups no effort has been made to catalog them here. Many plastics falling into these classes are commercially available from Hooker Chemical Corporation, Durez Plastic Division of North Tonowanda, N.Y., or from Fibrite Corporation, Universal Manufacturing Co., Winona, Minn.

The plastic activation and metallization technique described hereinabove has proved to be extremely useful in the manufacture of IBM "Selectric" typewriter heads. The typewriter heads manufactured as taught hereinabove are not subject to chipping or peeling are resistant to impact and have lifetimes three or four times longer than the lifetimes of typewriter heads produced by prior art techniques. In addition, the present process is less expensive and time consuming.

What is claimed is:

1. A method for activatig a plastic for subsequent metallization comprising the steps of:

polymerizing a coating of formaldehyde by drying on the surface of a plastic selected from the group consisting of urea formaldehyde plastic, phenolic formaldehyde plastic, melamine formaldehyde plastic, and arylsulfonamide-formaldehyde resins, said formaldehyde being a reducing agent for a metal salt and, depolymerizing said formaldehyde coating by contacting it with a reducible catalytic metal salt solution for a time to chemically bond the metal constituent of said salt to said coating.

2. A method according to claim 1 wherein said reducible catalytic salt includes a catalytic salt selected from the group consisting of palladium chloride, gold chloride, nickel chloride, nickel sulphate, cobalt sulphate and copper sulphate.

3. A method according to claim 1 wherein said catalytic metal is a metal selected from the group consisting of palladium, gold, nickel, cobalt and copper.

4. A method according to claim 1 wherein said time is preferably 1 minute.

5. A method according to claim 1 further including the step of:

electrolessly plating said plastic with a substance which is catalyzed by said metal constituent of said reducible catalytic salt to form an adherent conductive coating on said plastic.

6. A method according to claim 5 further including the step of:

electroplating a metal onto the surface of said electrolessly plated metal coating.

7. A method according to claim 5 wherein the step of electrolessly plating includes the steps of immersing said plastic in a plating bath for a time sufficient to form a thin coating of metal on the surface of said plastic and at a temperature below which said plastic deforms.

8. A method according to claim 5 wherein said substance includes self-catalytic metals and alloys of said metals.

9. A method according to claim 8 wherein said metals include nickel, cobalt, copper and palladium.

10. A method according to claim 8 wherein said alloys of said metals include nickel iron, nickel cobalt, and nickel tungsten phosphorous.

11. A method according to claim 1 wherein the step of depolymerizing said coating includes the steps of:

dipping said coated plastic into said solution of said formaldehyde to initiate depolymerization of said coated surface, heating said solution of said reducible catalytic salt to a temperature sufficient to depolymerize said formaldehyde dipping said plastic into said heated solution to make available a plurality of sites in said coating for deposition of said metal; and reducing said catalytic salt to intersperse said coating at said sites with said metal.

12. A method according to claim 11 further including the step of:

dipping said plastic alternately into said solution of said formaldehyde and into said solution of said reducible catalytic salt to augment the available sites in said coating and to enhance the bonding of said metal.

13. A method according to claim 11 wherein said solution of said reducible catalytic salt consists of 1 gram of palladium chloride per liter of distilled water and 10 cc./liter of concentrated HCl.

14. A method according to claim 1 wherein the step of polymerizing by drying includes the steps of:

cleaning the surface of said plastic by soaking in an acidic solution, dipping said plastic into a solution of said formaldehyde and a solvent for a time sufficient to form a coating of said formaldehyde on the surface of said plastic; and drying said coated plastic in air at room temperature to polymerize said coating.

15. A method according to claim 14 wherein said acidic solution is a 1:1 solution of nitric acid in water by volume.

16. A method according to claim 14 wherein said time sufficient to form a coating on said plastic is preferably 10 minutes.

17. An article of manufacture comprising a plastic substrate selected from the group consisting of urea formaldehyde plastic, phenolic formaldehyde plastic, melamine formaldehyde plastic and arylsulfonamide-formaldehyde resins;

a first layer of formaldehyde bonded to said substrate;

a plurality of particles of a catalytic metal interspersed in and bonded with said first layer; and a second layer of a self-catalytic substance overlying said first layer in intimately bonded relationship.

18. An article of manufacture according to claim 17 wherein said catalytic metal includes, palladium, nickel, cobalt and copper.

19. An article of manufacture according to claim 17 wherein said self-catalytic substance includes metals and alloys of said metals.

20. An article of manufacture according to claim 19 wherein said self-catalytic metals include nickel, copper, cobalt and palladium.

21. An article of manufacture according to claim 19 wherein said alloys of said metals include nickel iron, nickel cobalt, nickel tungsten phosphorous.

References Cited

UNITED STATES PATENTS

| | | |
|---|---|---|
| 3,035,944 | 5/1962 | Sher et al. |
| 3,075,856 | 1/1963 | Lukes. |

FOREIGN PATENTS

| | | |
|---|---|---|
| 263,728 | 3/1927 | Great Britain. |

ALFRED L. LEAVITT, Primary Examiner

J. A. BELL, Assistant Examiner

U.S. Cl. X.R.

29—194, 199; 117—47, 160, 138.8; 204—30, 38